United States Patent [19]

Yoshida

[11] Patent Number: 4,718,038

[45] Date of Patent: Jan. 5, 1988

[54] DATA SECURITY DEVICE FOR STORING DATA AT A PERIPHERAL PART OF THE DEVICE DURING POWER DOWN THUS PREVENTING IMPROPER RETRIEVAL

[75] Inventor: Masanobu Yoshida, Kawaguchi, Japan

[73] Assignee: Fujitsu Limited, Kawasaki, Japan

[21] Appl. No.: 700,176

[22] Filed: Feb. 11, 1985

[30] Foreign Application Priority Data

Feb. 23, 1984 [JP] Japan .............................. 59-033018

[51] Int. Cl.⁴ ............................................. G06F 9/00
[52] U.S. Cl. ............................................. 364/900
[58] Field of Search ............... 364/200, 900; 365/154, 365/149, 229

[56] References Cited

U.S. PATENT DOCUMENTS

| | | | |
|---|---|---|---|
| 4,375,086 | 2/1983 | van Velthoven | 365/149 |
| 4,382,279 | 5/1983 | Ugon | 364/200 |
| 4,435,786 | 3/1984 | Tickle | 365/154 |
| 4,539,660 | 9/1985 | Miyauchi et al. | 365/229 |

Primary Examiner—Gareth D. Shaw
Assistant Examiner—John G. Mills
Attorney, Agent, or Firm—Staas & Halsey

[57] ABSTRACT

A memory system having an erasable programmable read only memory (EPROM) for storing principal data, a read only memory (ROM) for storing key data, and a processing unit for writing or reading the principal data into or from the EPROM under control of the key data. The EPROM has an address converter having a volatile memory for temporarily storing the key data. External address data for wiring the principal data into the EPROM are converted to internal address data by the address converter using the key data stored in the volatile memory; the principal data stored in the EPROM are read out by converting external address data into internal address data, again using the key data stored in the volatile memory. The key data stored in the ROM are read out and applied to the volatile memory during the power turn-on of the memory system, the key data controlling the processing by the processing unit.

14 Claims, 10 Drawing Figures

DATA SECURITY DEVICE FOR STORING DATA AT A PERIPHERAL PART OF THE DEVICE DURING POWER DOWN THUS PREVENTING IMPROPER RETRIEVAL

BACKGROUND OF THE INVENTION

The present invention relates to a memory system having a semiconductor memory device and, more particularly, to a memory system which protects principal data stored in the semiconductor memory device from being copied.

In a television game system for example, the system has usually a microcomputer having an erasable programmable read only memory device (EPROM) which is a type of a programmable read only memory device (PROM) which is electrically programmable. The game can be performed by the microcomputer, controlled by the program data stored in the EPROM. Since the program involves the software of the television game, it is very important to protect the program data from being copied. Generally, creating a program is a hard task and requires a lot of man-hours, so that user access to the program data causes great economic damage to a system maker and a program owner.

Not only in the television game system, but also in other systems, a program is so important that the system maker and program owner must take precautions against dishonest persons who try to imitate same and sell a similar system by copying the program data. Therefore, it has been required to achieve a memory means from which the stored data cannot be copied.

Efforts for protecting the stored data from the memory device have been made, but only on the simple substance of a memory device. For example, there is a semiconductor memory device improved so that the data stored in the memory device cannot be read from the simple substance of the memory device. However, since the measure is taken only in the memory device, it can be easily overcome by the persons skilled in the art. Then, there are many illegal copies in the market. Thus, protection against improper retrieval of stored data from a memory device presents a big problem in the field of the semiconductor memory device.

SUMMARY OF THE INVENTION

An object of the present invention is to provide a memory system having a semiconductor memory device which prevents data stored in the memory device from being copied in useful form, simply from the memory device.

A further object of the present invention is to provide such a memory system wherein the additional power consumption is less than one percent of the power consumed in the prior art semiconductor memory device.

Yet a further object of the present invention is to provide such a semiconductor memory device in the memory system without enlarging its size from that of the prior art semiconductor memory device.

Still a further object of the present invention is to provide such a memory system at low cost.

The present invention is achieved and implemented by improving the memory device of a memory system and particularly by storing key data at an optional or peripheral part of the system, but not in the memory device itself. The above improvement being applied, the key data cannot be recovered or read out from the memory device, and likely cannot even be found in the memory system because the memory system consists of many components rendering its discovery a long and difficult task, if at all possible.

An EPROM can be applied as a semiconductor memory device and the EPROM is modified so as to have additionally an address converting means through which external address data are converted into internal address data; the external address data are what are applied to the memory device from the exterior, and the internal address data are for accessing to the memory portion of the EPROM, termed memory cells. The address converter has a volatile memory in which key data, provided in the memory system but not in the memory device, are tentatively stored, and the stored key data are used for the conversion. Storing or erasing the key data into or from the volatile memory is performed by turning the system power on or off respectively, so that the key data can be protected from being found out.

DETAILED DESCRIPTION OF THE INVENTION

Figure 1:
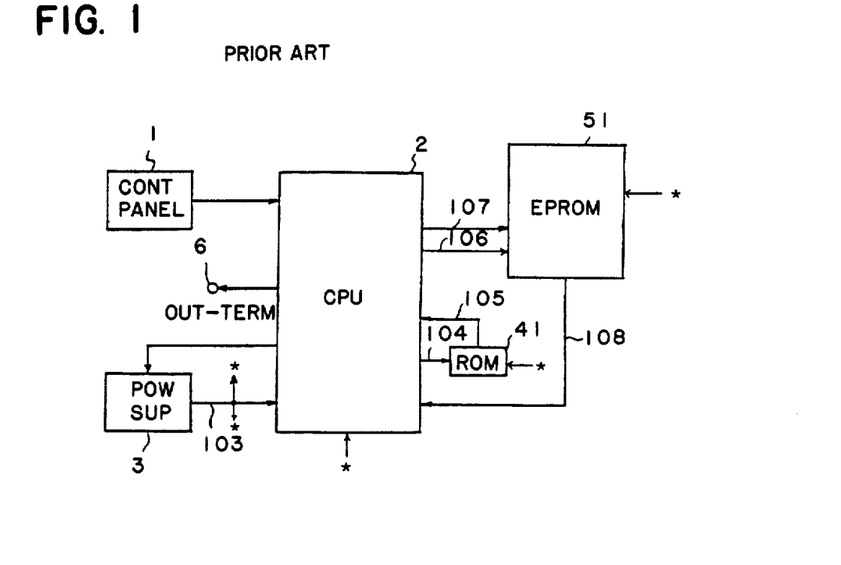
FIG. 1 is a block diagram of a computing system which employs a prior art EPROM.
Figure 2:
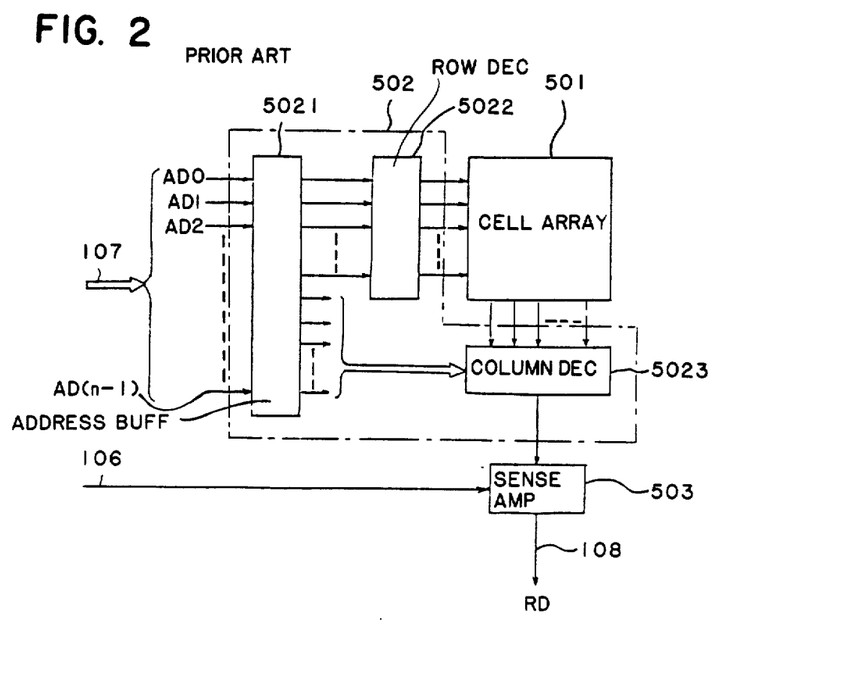
FIG. 2 is a block diagram of the prior art EPROM of the computing system of FIG. 1.

Before disclosing the present invention, the function of a prior art EPROM in a computing system will be discussed as shown in FIGS. 1 and 2 to enable a better understanding of the present invention.

In FIG. 1, the power of the computing system is turned on by operating a control panel (CONT PANEL) 1. The power-on control signal is fed to a central processing unit (CPU) 2 which controls the power supply (POW SUP) 3. The POW SUP 3 supplies power to every unit of the system through LINEs 103 marked by asterisks (*). The CPU 2 is a conventional type and is controlled by the processing data stored in a read only memory (ROM) 41. The processing data are accessed by the CPU 2 through a LINE 104 and the data are fed to the CPU 2 through a line 105. An EPROM 51 is for storing permanently the data, such as program data or operating system data, which data will be called the "principal data" hereinafter for distinguishing it from other data such as key data and address data. The EPROM 51 has plurality of memory cells for storing the principal data, and has an individual address for each cell. The principal data are accessed by external address data fed from the CPU 2 through a LINE 107 for reading the principal data from the EPROM 51 through a LINE 108. The address data consists of a plurality of bit signals which are simultaneously fed to the EPROM, being called the "address signals" hereinafter. The principal data read from the EPROM 51 are processed in the CPU 2 and fed to respective units through an output terminal (OUT-TERM) 6. The access for reading the principal data from the EPROM 51 is made in the EPROM 51 by an access control signal fed from the CPU 2 through a LINE 106.

In FIG. 2, the external LINEs having the same reference numerals to those in FIG. 1 designate the same parts, but the LINE 108 has only an arrow for reading the principal data because the figure shows only a case of reading the principal data; a symbol RD on the LINE 108 means the data read from the EPROM 51. A cell array (CELL ARRAY) 501 consists of plurality of a memory cells arranged in a matrix. The matrix consists of rows and columns, so an address signal circuit 502 is provided for accessing the principal data stored in the CELL ARRAY 501. The address signal circuit 502 is a conventional type consisting of an address buffer (ADDRESS BUFF) 5021, a row decoder (ROW DEC) 5022, and a column decoder (COLUMN DEC) 5023. Reference numerals AD0, AD1, - - -, and AD(n−1) show the external address signals. The external address signals are fed to the ADDRESS BUFF 5021 consisting of buffer devices such as inverters. The output of the ADDRESS BUFF 5021 is fed to the ROW DEC 5022 and the COLUMN DEC 5023 respectively, each decoder consists of decoding devices such as logical AND circuits and produces decoded address signals. The decoded address signals directly access to the CELL ARRAY 501, and the stored principal data are read out and fed to a sense amplifier (SENSE AMP) 503. A sense amplifier is a buffer amplifier for writing or reading the principal data into or from the memory cells, but the SENSE AMP 503 in FIG. 2 is for only reading the principal data.

Figure 3:
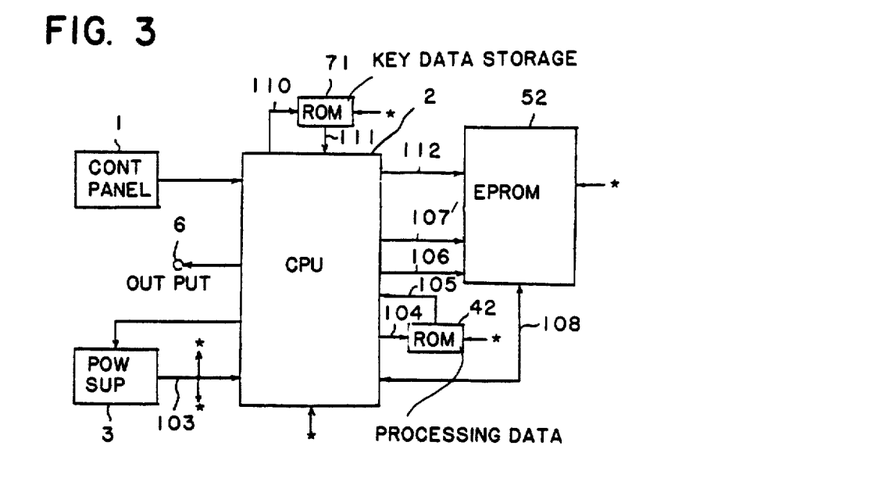
FIG. 3 is a block diagram of a computing system which employs a memory system having an improved EPROM in accordance with a first embodiment of the invention.
Figure 4:
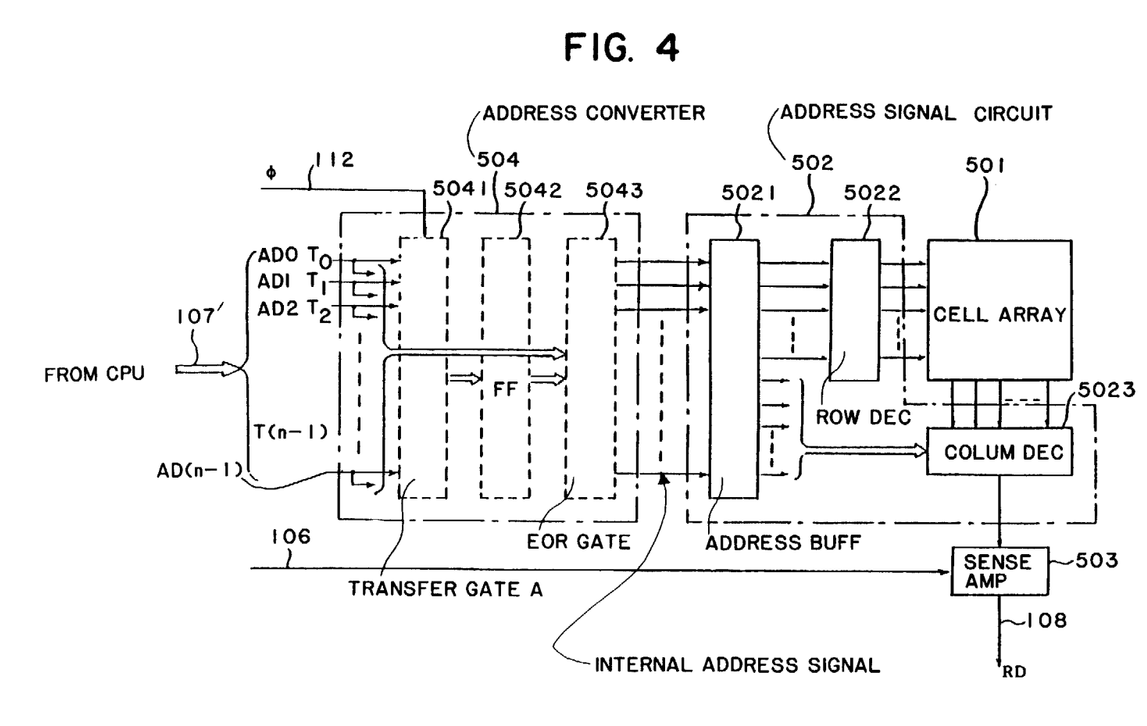
FIG. 4 is a block diagram of the EPROM of FIG. 3.
Figure 5:
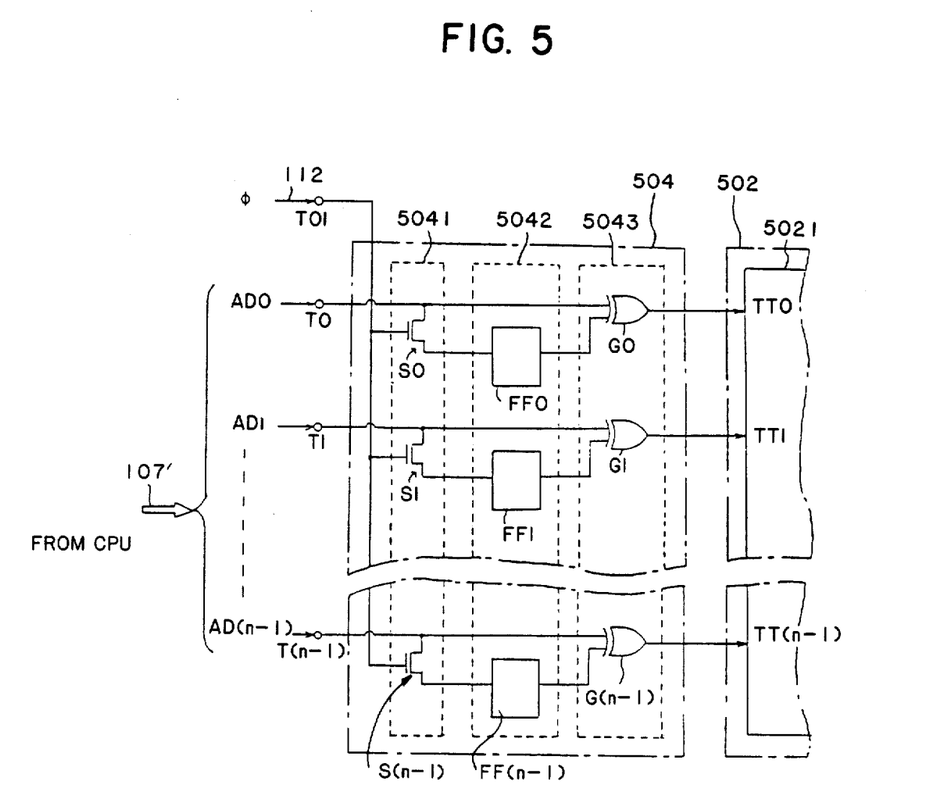
FIG. 5 is a block diagram of an address converter employed in the EPROM of FIG. 4.

A detailed description of the present invention now will be set forth in relation to two embodiments respectively relating to two kinds of key data; FIGS. 3 to 5 are for the first embodiment and the rest are for the second embodiment.

FIG. 3 is a computing system which includes a memory system in accordance with the present invention, having a novel EPROM 52 using a first kind of key data. In the figure, the same reference numerals or symbols to those in FIG. 1 designate the same parts or units. The computing system is similar to that of FIG. 1 except that the processing data is modified in accordance with the key data and a memory device is added for storing the key data. The ROM 71 is to store key data and is hidden in the computing system, or the memory system but not within the EPROM 52, for protecting the key data from being found. The processing data for processing the key data are stored in the ROM 42. The key data in the ROM 71 are accessed by the CPU 2 through a LINE 110 and are fed to the CPU 2 through the LINE 111 and are further fed to the EPROM 52 through the LINE 107'. Thus, the LINE 107' is used for feeding the external address data and the key data to the EPROM 52. However, the key data are fed to the EPROM 52 in a short period of time when the power of the memory system is ON; the period and timing are controlled by changing the voltage level of a gate signal $\phi$ to high or low states, the gate signal being fed to the EPROM 52 from the CPU 2 through a LINE 112, and the sequence of applying the key data is advanced in the CPU 2 in accordance with the processing data stored in the ROM 42.

The EPROM 52 is constructed by adding an address converter 504 to the prior art EPROM 51 of FIG. 1, as shown in FIG. 4. The address converter 504 consists of a group of transfer gates (TRANSFER GATE A) 5041, of flip flop circuits (FF) 5042, and of logical exclusive OR gates (EOR GATE) 5043. When the key signals or the external address signals are fed to address input terminals T0, T1, - - - , and T(n−1), the signals are fed to the TRANSFER GATE A 5041 and the EOR GATE 5043. The gate signal $\phi$ is fed to the TRANSFER GATE A 5041 through the LINE 112 (one line of the LINE 107' can be used instead of the LINE 112 for minimizing the number of the external connecting wires of the EPROM 52). In the prior art, the external address signals were directly fed to the address signal circuit 502 as shown in FIG. 2; however, in the present invention, the external address signals are first converted into internal address signals by the address converted 504, and the internal address signals are fed to the address signal circuit 502, the order of the address signals being changed by the key data.

The EPROM 52 has two functional modes: a reading mode and a writing mode. The principal data can be written into the EPROM 52 in the writing mode and read from the EPROM 52 in the reading mode. The writing mode is enabled and employed only in the fabrication stage, during production; the principal data can be written into the EPROM 52 or revised, in production, by using exclusive equipment such as an EPROM writer. The reading mode is enabled for and employed by the user. FIG. 4 shows the EPROM 52 in the reading mode.

A block diagram of the address converted 504 is shown in FIG. 5. In FIG. 5, the same reference numerals or symbols as those in FIG. 4 designate the same parts or units. The address converter 504 has (n) external address input terminals T0, T1, - - - , and T(n−1) and one gate signal terminal T01, and n outputs which go to internal address input terminals TT0, TT1, - - - , and TT(n−1) of the ADDRESS BUFF 5021; that is, the external address signals comprising bit signals AD0, AD1, - - - , and AD(n−1) are converted into internal address signals and fed to the internal address intput terminals TT0, TT1, - - - , and TT(n−1). The gate signal terminal T01 and the LINE 112 mentioned above are not always necessary and instead, one terminal of the external address input terminals T0, T1, - - - , and T(n−1) and one line of the LINE 107 can be used for the gate signal $\phi$, to minimize the number of connecting wires from the EPROM 52. The EOR GATE 5043 consists of (n) exclusive OR gates G0, G1, - - - , and G(n−1), each having two input terminals and one output terminal. One input terminal of each EOR gate G0, G1, - - - , and G(n−1) is connected to a respective external address input terminal T0, T1, - - - , and T(n−1), the other input terminal being connected to the output of a respective flip flop (FF) circuit FF0, FF1, - - -, and FF(n−1) which will be discussed later, and the output terminal of each EOR gate G0, G1, - - - , and G(n−1) is connected to a respective internal address input terminal TT0, TT1, - - - , and TT(n−3) of ADDRESS BUFF 5021. Since each EOR gate is an exclusive OR gate, the relation between the input and the output of each EOR GATE G0, G1, - - - , and G(n−1) is as follows: if one input is a bit signal 0, the output bit signal becomes equal to the other input bit signal; and if one input is a bit signal 1, the output becomes a reversed bit signal relative to the other input bit signal.

The FF 5042 consists of (n) flip flop (FF) circuits FF0, FF1, - - -, and FF(n−1). Each FF circuit is a reset-set flip flop circuit and functions as follows: when the power to the FF circuit is turned on and no input signal of a level 0 comes in, the input level of the FF circuit remains low (a level 0), so the FF circuit is in a "reset" state, producing an output of a level 0; when an input of a level 1 is fed to the FF circuit, the FF circuit is switched to a "set" state, producing an output of a level 1, the "set" state being held on until the FF circuit either receives an input of the level 0 or the power of the FF circuit is turned off. The TRANSFER GATE A 5041 consists of n transfer gates S0, S1, - - -, and S(n−1), each being a MOS transistor which functions as a switch. Each transfer gate is placed between a respective external address input terminal T0, T1, - - -, or T(n−1) and the respective FF circuit G0, G1, - - -, and G(n−1) and is controlled by the gate signal $\phi$ from the gate signal terminal T01. When the voltage level of the gate signal $\phi$ becomes high (H), each transfer gate S0, S1, - - -, and S(n−1) is ON so that a respective external address input terminal is connected to the respective FF circuit, and when the level is changed to low (L), the transfer gate is OFF so that the connection is disconnected. The gate signal is fed to every transfer gate, so all transfer gates S0, S1, - - -, and S(n−1) are simultaneously operated by the gate signal $\phi$.

In FIG. 5, the number of the devices in each group is equal to the number (n) (i.e., as seen in FIG. 5) of the external address signals. The number of the devices need not always be equal to the number of the address signals; however, the greater the number of the devices, the better is the capability of the system to protect the stored principal data from being copied.

In the writing or reading mode, the function of the EPROM 52 is advanced in following three steps: first, the key data are fed to the EPROM 52 and stored in the FF 5042 when the power to the EPROM 52 is turned on, to prepare for receiving the external address signals; second, the external address signals are fed to the EPROM 52 so that the principal data are written into or read from the EPROM 52; and third, the key data stored in the FF 5042 are erased when the power to the EPROM 52 is turned off. When the EPROM 52 is in the memory system, the three steps are performed in the reading mode, the first and second steps being automatically performed by CPU 2 in accordance with the processing data stored in the ROM 42 when the power of the memory system is turned on, and the third step being performed only by turning the power of the memory system off.

In the memory system, in the first step, the key data are fed to the external address input terminals and at the same time the gate signal $\phi$ becomes high, i.e., H, by turning the system power on. So, the respective transfer gate is ON and the respective key datum of a level 1 or 0 is fed to the respective FF circuit, so that the respective FF circuit is set so as to produce the output of a level 1 or 0 corresponding to the respective input key datum. Then the gate signal $\phi$ is returned to low, i.e., L. However, the state of respective FF circuit is held on until the power is turned off. Meanwhile, the respective EOR gate also receives the key datum and the output of its respective FF circuit, which causes the EOR gate to produce an output. However, in the first step, the CPU 2 functions so that the data received from the EPROM 52 are not treated as the principal data, so there is no necessity to consider the key data signals fed into the EOR gate in the first step. In the second step, the external address signals AD0, AD1, - - -, and AD(n−1) are fed into the external address input terminals T0, T1, - - -, and T(n−1) after the gate signal $\phi$ is returned to L. Thus, all transfer gates are OFF, so that each EOR gate receives a respective external address signal at the one input terminal and the output of respective FF circuit, which has been kept in a level of 0 or 1, at the other input terminal, producing the output of the internal address signal. Table 1 shows an example of this.

TABLE 1

| Address Symbol | External Address Signals | Key Data | Internal Address Signals |
|---|---|---|---|
| AD0 | — 1 0 1 — | 0 | — 1 0 1 — |
| AD1 | — 1 0 0 — | 1 | — 0 1 1 — |
| AD2 | — 0 1 1 — | 1 | — 1 0 0 — |
| AD3 | — 0 1 1 — | 0 | — 0 1 1 — |
| AD4 | — 1 1 1 — | 1 | — 0 0 0 — |
| AD5 | — 0 0 1 — | 0 | — 0 0 1 — |
| AD6 | — 1 0 1 — | 0 | — 1 0 1 — |
| AD7 | — 0 0 0 — | 1 | — 1 1 1 — |

In Table 1, assume that the matrix of the CELL ARRAY 501 consists of 16 rows and 16 columns and the address symbols AD0, 1, 2, and 3 are for the rows, and AD4, 5, 6, and 7 are for the columns. Three groups of the external address signals are shown as an example in the table, producing three corresponding groups of internal address signals. Comparing between respective groups of the external and internal address signals, it will be clear that the internal address signals are converted so as to be completely different from the external address signals. The key data can be taken as much as 8th power of 2 varieties, i.e., 256 variations.

Figure 10:
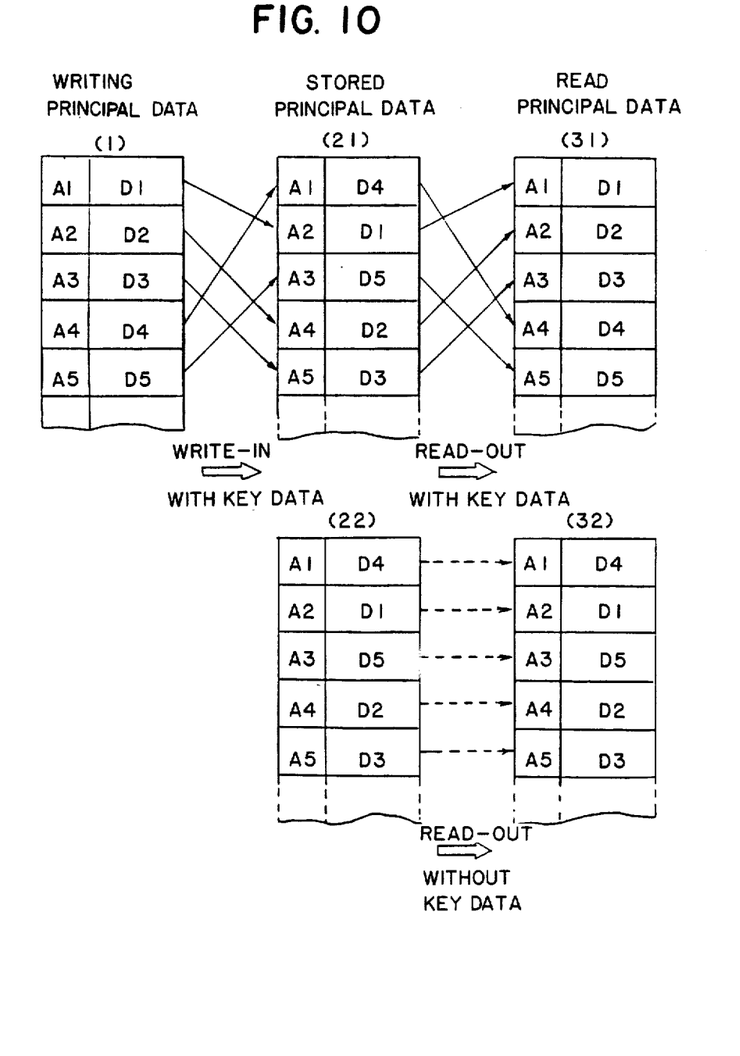
FIG. 10 is a diagram illustrating the relation among the writing of, the stored, and the reading of the principal data in relation to the respective addressing data.

FIG. 10 shows the relation among writing, stored, and read principal data. The writing principal data are what are intended to be written into the EPROM 52 with the external address data, the stored principal data are what are stored in the EPROM 52 by the internal address data, and the read principal data are what are read from the EPROM 52 using the same address data as that used for writing the principal data. FIGS. 10(1), (21)–(22), and (31)–(32) show the writing, the stored and the read principal data, respectively, FIGS. 10(21) and (22) are both stored principal data, and FIGS. 10(31) and (32) are both read principal data, but of different kinds. In the figures, reference symbols A1, A2, A3, - - - mean the address data, D1, D2, D3, - - - mean the principal data, and respective A and D designations which are arranged in lateral relation to each other indicate the principal data D and its associated address data A. There are two groups of solid arrows between FIGS. 10(1) and (21) and between FIGS. 10(21) and (31), the former means that the external address data are converted into the internal address data by the key data when the principal data are written into the CELL ARRAY 501, and the latter means that the principal data stored in the CELL ARRAY 501 are read out using the same key data. The former is performed during production, and the latter is performed by the user. Therefore, if the CELL ARRAY 501 is removed from the memory system and the stored data is tried to be read out, the data are read out with the address data being equal to the internal address data. The same result occurs when the stored principal data are read out in the memory system without using the key data. These are shown in FIGS. 10(22) and (32), and the group of parallel dotted arrows means that the stored principal data are read out without the key data.

In the third step, the system power is turned off, then the key data stored in the FF circuit 5042 disappear because of the character of the volatile memories.

The three steps also can be applied in the writing mode when the principal data is written into the EPROM 52 by using the EPROM writer in production.

In the above description, the key signals are fed to the EPROM 52 in parallel. However, the key data can be fed to the EPROM 52 as a series of key signals. The second embodiment shown in the figures from 6 to 9 performs in this series manner. This key data will be called "series key data". In the figures, the same reference numerals or symbols as those in the figures from 1 to 5 designate the same parts or units.

Figure 6:
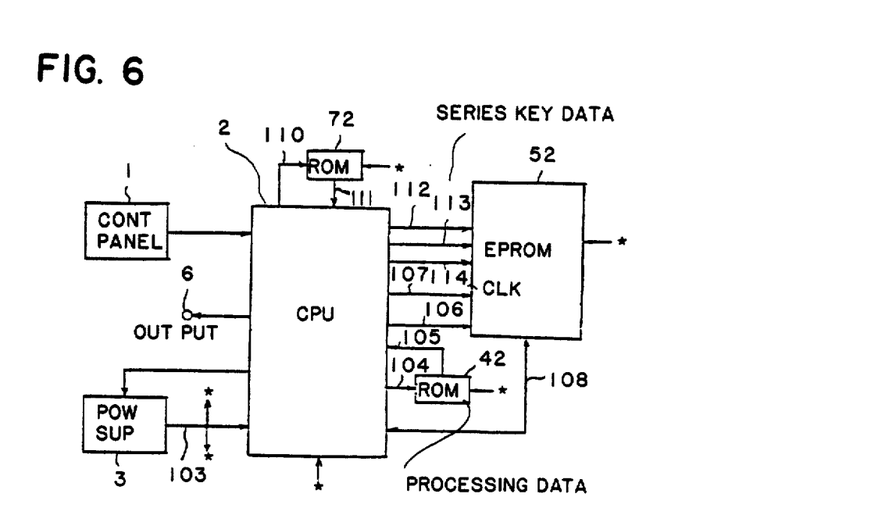
FIG. 6 is a block diagram of a computing system which employs a memory system having an improved EPROM in accordance with a second embodiment of the invention.

FIG. 6 shows a block diagram of a computing system having a novel memory device which uses series key data in accordance with the invention. In the figure, a ROM 72 stores the series key data, a LINE 113 is for feeding the series key data, and a LINE 114 is for feeding a clock signal which is needed to process the series key data.

Figure 7:
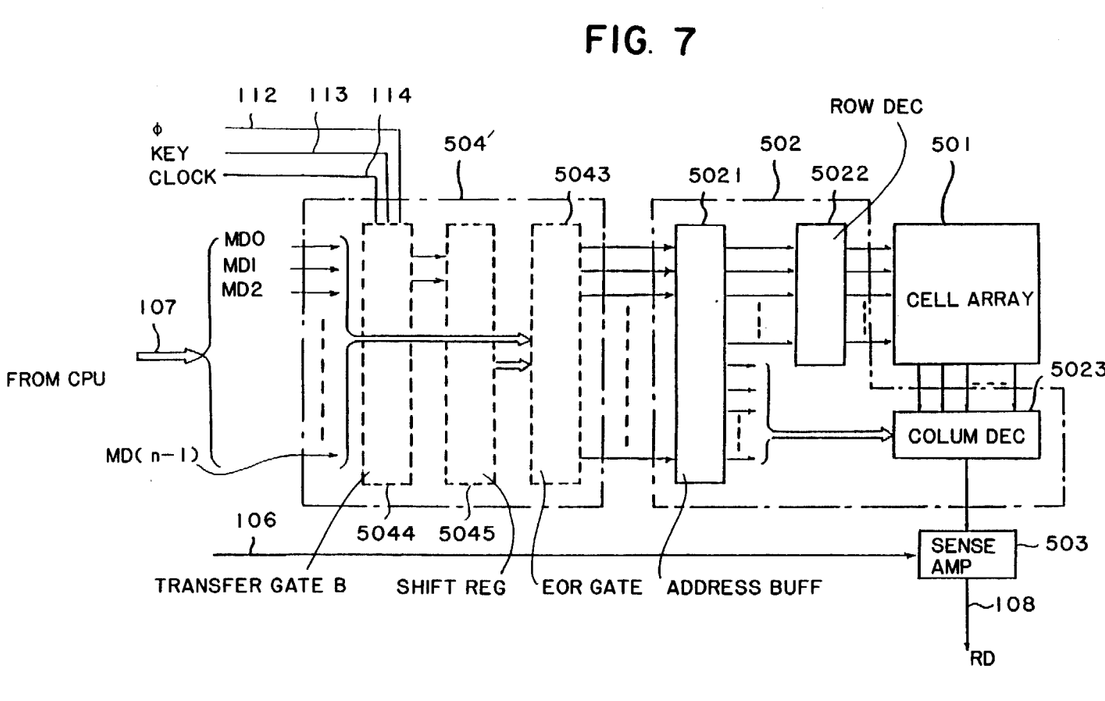
FIG. 7 is a block diagram of the EPROM of FIG. 6.

FIG. 7 shows a block diagram of an EPROM which uses the series key data in accordance with the invention. As shown in the figure, the EPROM has the same construction as the EPROM of the first embodiment, except for the means of converting the key data from series to parallel. The conversion is performed by a shift register (SHIFT REG) 5045 and a transfer gate B (TRANSFER GATE B) 5044 in the address converter 504'. The SHIFT REG 5045 consists of a plurality of shift register elements whose number is less than the number of the external address signals fed to the EPROM simultaneously; it also can be said that the greater this number is, the better is the protection afforded the EPROM from being copied. The EOR GATE 5043 is the same as that of the first embodiment of FIG. 4; one input terminal of each individual EOR gate therein receives a respective external address signal and the other input terminal thereof receives a respective output from the SHIFT REG 5045. The series key data and the clock signal are fed to the TRANSFER GATE B 5044 in which they are gated by the gate signal $\phi$ so that they are fed to the SHIFT REG 5045, respectively passing through the TRANSFER GATE B 5044 when the gate signal $\phi$ is H.

Figure 8:
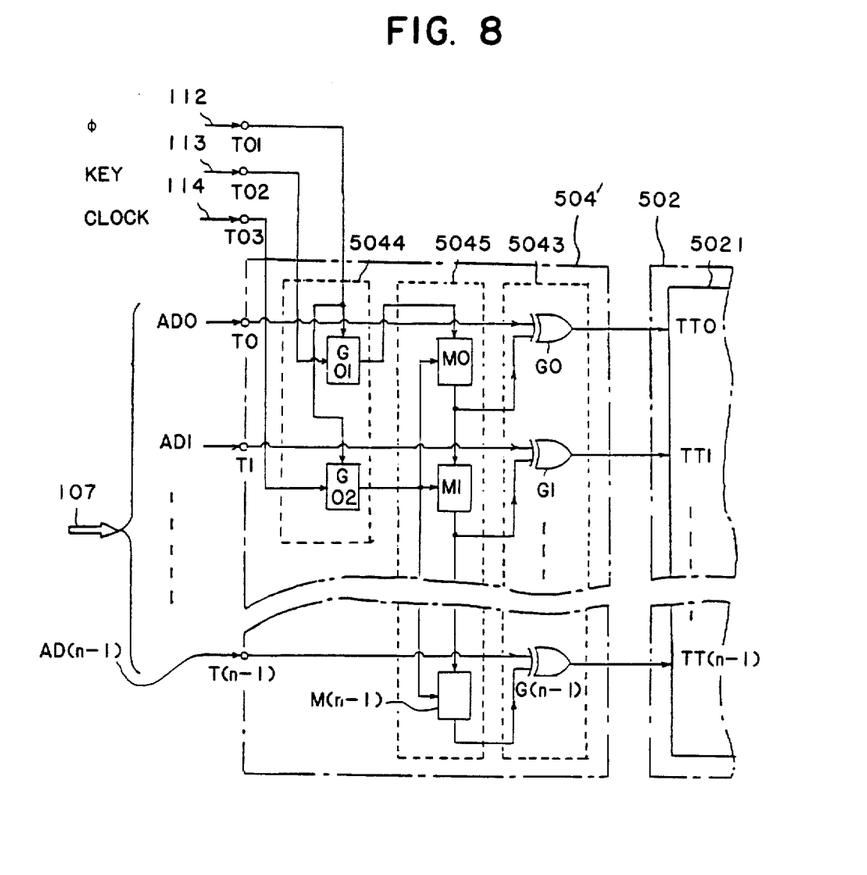
FIG. 8 is a block diagram of an address converter employed in the EPROM of FIG. 7.
Figure 9:
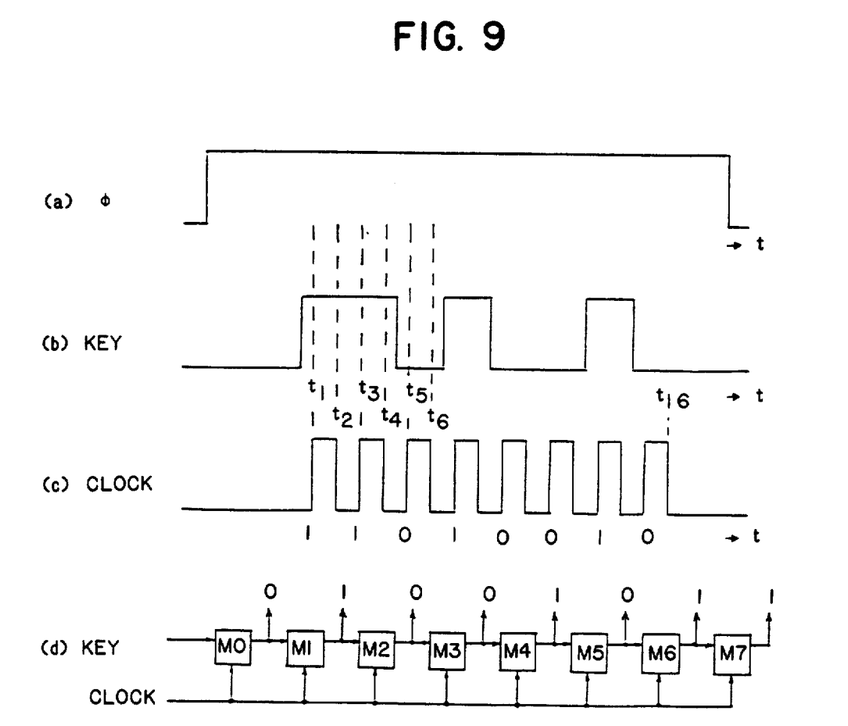
FIG. 9 is a diagram illustrating the function of the EPROM of FIG. 8.

FIG. 8 shows a block diagram of the address converter 504' of the second embodiment of the invention. The function of the address converter is explained with reference to FIGS. 9(a), (b), (c) and (d) which illustrate respectively the relation among the gate signal, the series address signals, the clock signals, and the output of the SHIFT REG 5045, the latter being shown by bit signals. The block diagram of the SHIFT REG 5045' is also shown in FIG. 9(d). TRANSFER GATE B 5044 consists of two transfer gates G01 and G02, the series key signals being fed to G01 and the clock signals being fed to G02 and both signals being gated by the gate signal $\phi$ as shown in FIGS. 9(a), (b), and (c). The gate signal $\phi$, the key signals, and the clock signals are provided in CPU 2, and the width, number, and timing of each pulse of these respective signals depend on the nature of the external address data and the key data. FIG. 9 shows an example when the number of external address signals is eight and the SHIFT REG 5045 consists of eight elements M0, M1, - - -, and M7 as shown in FIG. 9(c). The clock signals are fed to each element of the SHIFT REG 5045 and the key signals are fed to the SHIFT REG. 5045 from M0 to M7, both signals having the relation as shown in FIGS. 9(b) and (c) (the abscissa in FIGS. 9(a), (b), and (c) being expressed in time "t"). In FIGS. 9(a) and (b), each element of the shift register produces the output of a level 1 when the leading edge of the clock pulse coincides with the high level of the key signal, and the element produces the output of a level 0 when the leading edge coincides with the low level of the key signal. The output level produced from each element is shifted to the next element at the trailing edge of each clock pulse. So, the element M0 produces a level 1 at time $t_1$ and the level 1 is shifted to the next element M1 at time $t_2$ and so on. As a result, when all pulses have been fed to the shift register (at time $t_{16}$ in the figure), the respective elements produce the output levels as shown in FIG. 9(d), and these states are held on until the power to the shift register is turned off. Thus, the series key data as shown in FIG. 9(b) are converted to the parallel key data as shown in FIG. 9(d), and the converted parallel key signals are fed to the respective gates G0, G1, - - -, and G(n−1) of the EOR GATE 5043. The sequence of feeding the gate signal, the key data, and the clock signal to the EPROM, and the three steps for writing or reading the principal data into or from the EPROM are the same as those in the first embodiment. In the first and second embodiments, the address converter 504 or 504' is located between the input terminals for the external address signals and the ADDRESS BUFF 5021 in the address signal circuit 502 as shown in FIGS. 4, 5, 7, or 8. However the address converter 504 or 504' can be placed between the ADDRESS BUFF 5021 and the decoders (ROW DEC 5022 and COLUMN DEC 5023) in the address signal circuit 502.

Applying the memory system having the EPROM to a system like a computing system as mentioned in the first and second embodiments, the principal data cannot be copied from the EPROM itself because the key data are not stored in the EPROM, and the key data cannot be found because they are stored at the periphery of the EPROM (there are many electrical components), and the key data are used only in the closed memory system; nobody knows what is and where is the key data except the system maker. The components used in the address converter 504 are made of the metal oxide semiconductor (MOS), so the additional power consumption required by the additional components is as little as less than one percent of the power consumption of the usual EPROM. The die size of the EPROM is the same as that of the usual EPROM because the additional components are few and the additional connecting wires are also few. Therefore, the cost increase for implementing the present invention is negligible. The EPROM can be used conventionally without the key data, because every FF circuit or element of the shift register produces the output of a level 0 if the gate signal $\phi$ is not supplied, so the principal data can be accessed by only the external address data without the key data.

In the embodiments mentioned above, the EPROM is used for the semiconductor memory device, however, a programmable read only memory device (PROM), whose stored data cannot be erased when the data has been written in it, can be also employed as the semiconductor memory device in the memory system.

What is claimed is:

1. A memory system for storage protection comprising:
   non-volatile memory means for storing key data;
   a programmable read only memory device connected to said non-volatile memory means, comprising:
     a plurality of address input terminals for receiving external address data and key data;
     a plurality of non-volatile memory cells for storing principal data;
     volatile memory means, connected to said address input terminals, for storing key data;
     address converting means, connected to said volatile memory means, for converting external address data received at said plurality of input terminals to internal address data in accordance with a logical operation between the key data and the external address data; and
     means responsive to the internal address data, connected between said address converting means and said non-volatile memory means, for accessing said non-volatile memory cells to read out principal data stored therein; and
   processing means, connected to said non-volatile memory means and said programmable read only memory device including said non-volatile memory cells, for processing the reading of principal data from said non-volatile memory cells, comprising:
     means responsive to initial power turn-on of said memory system, connected to said non-volatile memory means and said volatile memory means, for reading stored key data from said non-volatile memory means and supplying same to said volatile memory means for storage therein, said volatile memory means maintaining the storage of key data therein during continuous supply of power thereto, and the key data stored therein terminating upon cessation of the supply of power thereto; and
     conversion means, connected to said address input terminals, for supplying external address data to said plurality of address input terminals in accordance with a selected sequence, said address converting means of said programmable read only memory device converting said external address data to internal address data, and for reading out principal data from said plurality of non-volatile memory cells, in accordance with the selected sequence.

2. A memory system as recited in claim 1, wherein:
   said programmable read only memory device further comprises transfer gate means connected between said plurality of address input terminals and said volatile memory means; and
   said processing means further comprises means for producing a gating signal to enable said transfer gate means to transfer key data applied to said address input terminals to said volatile memory means, in advance of supplying external address data to said address input terminals.

3. A programmable read only memory device according to claim 1, wherein said address converting means comprises a plurality of logical gate circuits.

4. A programmable read only memory device according to claim 3, wherein said plurality of logical gate circuits comprises a plurality of exclusive OR gates.

5. A programmable read only memory device according to claim 1, wherein said volatile memory means comprises a plurality of flip flop circuits.

6. A programmable read only memory device according to claim 1, wherein said volatile memory means comprises a shift register.

7. A memory system for storage protection comprising:
   a non-volatile memory for storing principal data;
   a plurality of address input terminals for receiving external address data and key data;
   address converting means, connected to said plurality of address input terminals, for converting external address data to internal address data in accordance with a logical operation between key data and external address data, said address converting means including:
     key data loading means, connected to said plurality of address input terminals, for receiving key data when said memory device is powered on;
     volatile memory means, connected to said key data loading means, for receiving and storing said key data from said key data loading means;
     logical gate means, connected to said volatile memory means and said plurality of address input terminals for receiving key data stored in said volatile memory means and external address data, and for converting said external address data into internal address data in accordance with a logical operation between said key data and external data, and then outputing internal address data; and
   responsive means, connected between said address converting means and said non-volatile memory for receiving said internal address data and for accessing said non-volatile memory for reading out principal data stored therein.

8. A memory system according to claim 7, wherein said address converting means comprises a plurality of logical gate circuits.

9. A memory system according to claim 8, wherein said plurality of logical gate circuits comprises a plurality of exclusive OR gates.

10. A memory system according to claim 7, wherein said volatile memory means comprises a plurality of flip flop circuits.

11. A memory system according to claim 7, wherein said volatile memory means comprises a shift register.

12. A programmable read only memory device according to claim 7, said key data loading means comprising:
   transfer gate means connected between said plurality of address input terminals and said volatile memory means;
   data supplying means, connected to said address input terminals, for supplying key data to said plurality of address input terminals; and
   signal supplying means, connected to said transfer gate means, for supplying a control signal to said transfer gate means;
   said transfer gate means being selectively controlled by the control signal applied thereto, to transfer key data from said plurality of address input terminals to said volatile memory means.

13. A programmable read only memory device as recited in claim 12, wherein key data is supplied as parallel bits to corresponding ones of said plurality of address input terminals, and wherein:

said transfer gate means comprises a plurality of individual transfer gate means corresponding to said plurality of address input terminals to which external address data is applied;

said volatile memory means comprises a plurality of individual volatile memory means connected to respectively corresponding ones of said plurality of individual transfer gate means; and said address converting means comprises a plurality of logical gate circuits, each thereof having at least first and second input terminals and an output terminal, the first input terminals thereof being connected to respectively corresponding ones of said plurality of address input terminals, the second input terminals thereof being connected to respectively corresponding ones of said plurality of individual volatile memory means, and said output terminals thereof being connected to said accessing means.

14. A programmable read only memory device as recited in claim 12, wherein key data is supplied as serial bits in time sequence, and wherein:

said volatile memory means comprises a shift register having a number of serial stages corresponding to the number of serial bits of key data;

said transfer gate means comprises a first gate for receiving and applying serial key data bits in a predetermined time sequence to an input to said serial shift register stages, and timing gate means for enabling said shift register stages to receive and shift therethrough the serial key data bits in accordance with said predetermined time sequence thereof; and said address converting means comprises a plurality of logical gate circuits corresponding to said plurality of address input terminals to which external address data is applied, each thereof having at least first and second input terminals and an output terminal, the first input terminals thereof being connected to respectively corresponding ones of said plurality of address input terminals, the second input terminals thereof being connected to respectively corresponding ones of said serial stages of said shift register, and said output terminals thereof being connected to said accessing means.

* * * * *

UNITED STATES PATENT AND TRADEMARK OFFICE
CERTIFICATE OF CORRECTION

PATENT NO. : 4,718,038

DATED : January 5, 1988

INVENTOR(S) : MASANOBU YOSHIDA

It is certified that error appears in the above-identified patent and that said Letters Patent is hereby corrected as shown below:

```
Column 3, line 20,   after "of" (first occurrence) insert
--a--; and
                     after "of" (second occurrence) insert
--a--.
Column 4, line 24,   "converted" should be --converter--;
          line 39,   "converted" should be --converter--.
```

Signed and Sealed this

Twenty-eighth Day of June, 1988

Attest:

DONALD J. QUIGG

Attesting Officer

Commissioner of Patents and Trademarks